United States Patent
Kusumoto et al.

(10) Patent No.: US 10,771,941 B2
(45) Date of Patent: Sep. 8, 2020

(54) VEHICLE SYSTEM DEVICE AND VEHICLE SYSTEM

(71) Applicant: DENSO CORPORATION, Kariya, Aichi-pref. (JP)

(72) Inventors: Tetsuya Kusumoto, Nisshin (JP); Takashi Saitou, Nisshin (JP); Kenichiro Sanji, Nisshin (JP); Koji Sakamoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/590,477

(22) Filed: Oct. 2, 2019

(65) Prior Publication Data

US 2020/0037133 A1 Jan. 30, 2020

Related U.S. Application Data

(63) Continuation of application No. PCT/JP2018/008206, filed on Mar. 5, 2018.

(30) Foreign Application Priority Data

Apr. 7, 2017 (JP) ................. 2017-077048

(51) Int. Cl.
*H04W 4/48* (2018.01)
*H04W 64/00* (2009.01)

(52) U.S. Cl.
CPC ........... *H04W 4/48* (2018.02); *H04W 64/006* (2013.01)

(58) Field of Classification Search
CPC .......... H04W 4/021; H04W 4/40; H04W 4/48
See application file for complete search history.

(56) References Cited

U.S. PATENT DOCUMENTS

| | | | |
|---|---|---|---|
| 10,373,494 B1* | 8/2019 | Krysiuk | ................ H04W 4/023 |
| 2012/0154114 A1* | 6/2012 | Kawamura | ......... B60R 25/2072 |
| | | | 340/5.63 |
| 2015/0149042 A1* | 5/2015 | Cooper | ................... H04W 4/48 |
| | | | 701/48 |
| 2017/0105101 A1* | 4/2017 | Santavicca | ........... H04B 17/318 |
| 2018/0059209 A1* | 3/2018 | Cuddihy | ............... G01S 5/0226 |

FOREIGN PATENT DOCUMENTS

JP 5918101 B2 5/2016
WO WO-2018179435 A1 10/2018

* cited by examiner

*Primary Examiner* — David Bilodeau
(74) *Attorney, Agent, or Firm* — Harness, Dickey & Pierce, P.L.C.

(57) ABSTRACT

A vehicle system device is provided. The vehicle system device is used in a vehicle system that enables an in-vehicle device used in a vehicle and a mobile device carried by a user to transmit and receive a signal via a wireless communication. The vehicle system device may measure a time from a time point at which a reception intensity of the signal exceeds a threshold to a time point at which the reception intensity falls below the threshold.

9 Claims, 7 Drawing Sheets

VEHICLE SYSTEM DEVICE AND VEHICLE SYSTEM

CROSS REFERENCE TO RELATED APPLICATIONS

The present application is a continuation application of International Patent Application No. PCT/JP2018/008206 filed on Mar. 5, 2018, which designated the U.S. and claims the benefit of priority from Japanese Patent Application No. 2017-077048 filed on Apr. 7, 2017. The entire disclosures of all of the above applications are incorporated herein by reference.

TECHNICAL FIELD

The present disclosure relates to a vehicle system and a vehicle system device that determine whether a mobile device is located inside or outside a vehicle interior.

BACKGROUND

A technique that determines whether a mobile device is located inside or outside a vehicle interior using radio waves transmitted and received between an in-vehicle device and the mobile device has been proposed.

SUMMARY

The present disclosure provides a vehicle system device. The vehicle system device is used in a vehicle system that enables an in-vehicle device used in a vehicle and a mobile device carried by a user to transmit and receive a signal via a wireless communication. The vehicle system device may measure a time from a time point at which a reception intensity of the signal exceeds a threshold to a time point at which the reception intensity falls below the threshold.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
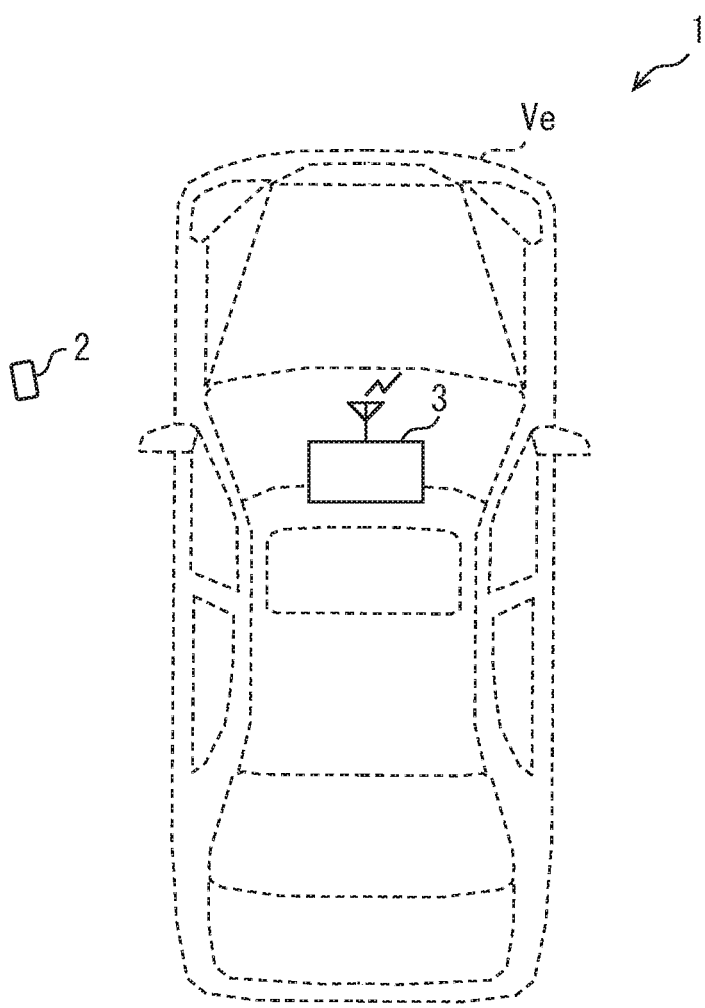
FIG. 1 is a view exemplarily showing a schematic configuration of a vehicle authorization system.

For example, it is determined whether a mobile device is located outside or inside a vehicle interior in accordance with whether or not the number of reflected waves subsequent to a direct wave of a response signal from the mobile device in response to a call signal from an in-vehicle device is equal to or less than a threshold. The technique uses the fact that the vehicle interior is a space surrounded with a metal body and thus generates a large number of reflected waves. In the technique, ultra wide band (UWB) radio waves having impulse waveforms to call signals and response signals are applied.

The technique fails to correctly count the number of reflected waves interfering with each other in a case where a transmitted pulse has too large a width to be ignored relative to an arrival time of the reflected waves (e.g., equal to or more than 1 nsec). Therefore, whether the mobile device is located outside or inside the vehicle interior has not been sometimes determined accurately in this case.

An example embodiment of the present disclosure provides a vehicle system device used in a vehicle system that enables an in-vehicle device used in a vehicle and a mobile device carried by a user to transmit and receive a signal via a wireless communication. The vehicle system device provided as the in-vehicle device or the mobile device. The vehicle system device includes a time measurement unit and an inside-outside determination unit. The time measurement unit measures a time from a time point at which a reception intensity of the signal, which is transmitted via the wireless communication and received by the vehicle system device, exceeds a threshold to a time point at which the reception intensity falls below the threshold. The threshold is within a receivable range of the reception intensity of the signal for the vehicle system device. The inside-outside determination unit executes an inside-outside determination of determining that the mobile device is located inside a vehicle interior of the vehicle when a measurement time, which is provided as the time measured by the time measurement unit, is equal to or more than a predetermined value, and determining that the mobile device is located outside the vehicle interior of the vehicle when the measurement time is less than the predetermined value.

In the example embodiment of the present disclosure, when the mobile device is located inside the vehicle interior, signals receivable by the subject device of either the in-vehicle device or the mobile device out of signals transmitted via the wireless communication are mostly reflected by the reflector such as metal surrounding the vehicle interior and thus mostly have long propagation time. The measurement time measured by the time measurement unit is thus longer in the case where the mobile device is located inside the vehicle interior than the measurement time of the case where the mobile device is located outside the vehicle interior. The inside-outside determination unit determines that the mobile device is located inside the vehicle interior of the vehicle in the case where the measurement time is equal to or more than the predetermined value, and determines that the mobile device is located outside the vehicle interior of the vehicle in the other case where the measurement time is less than the predetermined value. The inside-outside determination unit thus achieves accurate determination of whether the mobile device is located outside or inside the vehicle interior.

Even in a case where the signal transmitted via the wireless communication is a pulse having too large a pulse width to be ignored relative to an arrival time of reflected waves at the reflector such as metal surrounding the vehicle interior and the number of the reflected waves interfering with each other cannot be counted correctly, the measurement time measured by the time measurement unit is less likely to be influenced. This is because the time measurement unit measures the time from the time point at which the reception intensity of the signal transmitted via the wireless communication and received by the subject device exceeds the threshold set within the range of reception intensity enabling signal reception by the subject device to the time point at which the reception intensity falls below the threshold. Therefore, even in the case where the number of the reflected waves interfering with each other cannot be counted correctly, this configuration achieves accurate determination of whether the mobile device is located outside or inside the vehicle interior. This leads to more accurate determination of whether the mobile device is located outside or inside the vehicle interior.

With reference to the drawings, a plurality of embodiments for the disclosure will be described. For convenience of description, the same reference numerals are designated to parts having the same functions as those of parts illustrated in the drawings described in a plurality of embodiments, and their description may not be repeated. Regarding the parts to which the same reference numerals are designated, the description in another embodiment can be referred to.

First Embodiment (Schematic Configuration of Vehicle Authorization System 1)

As shown in FIG. 1, a vehicle authorization system 1 includes a mobile device 2 carried by a user and an in-vehicle device 3 used at a vehicle Ve. A condition "carried by a user" does not limitedly indicate a state of being carried by the user but also includes a state of not being carried by the user but being left behind. The vehicle authorization system 1 corresponds to a vehicle system. The in-vehicle device 3 according to a first embodiment corresponds to a subject device and a vehicle system device.

The mobile device 2 and the in-vehicle device 3 are each configured to transmit and receive signals via wireless communication. When the mobile device 2 is located within a communication range of the in-vehicle device 3 and the in-vehicle device 3 is located within a communicable range of the mobile device 2, one of the mobile device 2 and the in-vehicle device 3 transmits a signal via wireless communication and the other one thereof receives the signal. More specifically, when the mobile device 2 receives a request signal transmitted from the in-vehicle device 3, the mobile device 2 transmits a response signal including a code for authorization (hereinafter, referred to as an authorization code). The in-vehicle device 3 receives the response signal from the mobile device 2. The mobile device 2 may be provided as an electronic key.

(Schematic Configuration of Mobile Device 2)

Figure 2:
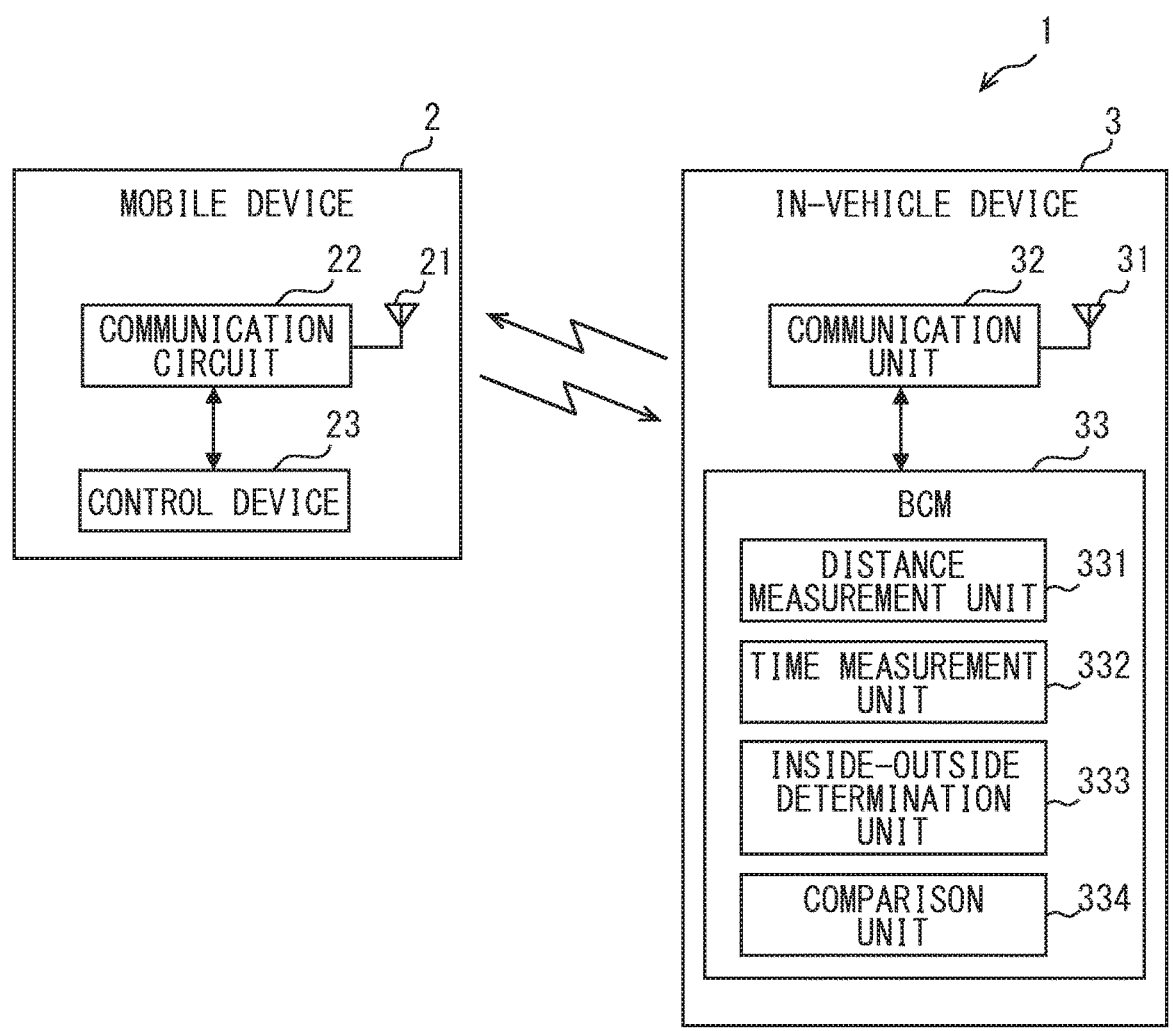
FIG. 2 is a diagram exemplarily showing schematic configurations of a mobile device and an in-vehicle device.

The mobile device 2 will be described next with reference to FIG. 2. As shown in FIG. 2, the mobile device 2 includes a mobile device communication antenna 21, a communication circuit 22, and a control device 23.

The mobile device communication antenna 21 is configured to receive the request signal transmitted from the in-vehicle device 3 and transmit the response signal in response to the request signal, by means of radio waves. The mobile device communication antenna 21 may alternatively include a transmission antenna and a reception antenna provided independently from each other.

The request signal and the response signal may be transmitted and received in frequency bands different from each other, such as an LF band and a UHF band. In the present embodiment, a frequency band of a common GHz band for both the request signal and the response signal is employed. The present embodiment will exemplify a case where the request signal and the response signal are pulse signals (hereinafter, simply referred to as pulses) in a frequency band of 3.1 GHz or higher. Wireless communication using pulses may be exemplarily executed by exchanging information in accordance with a pulse position modulation (PPM) system causing modulation at a pulse generated position.

Figure 3:
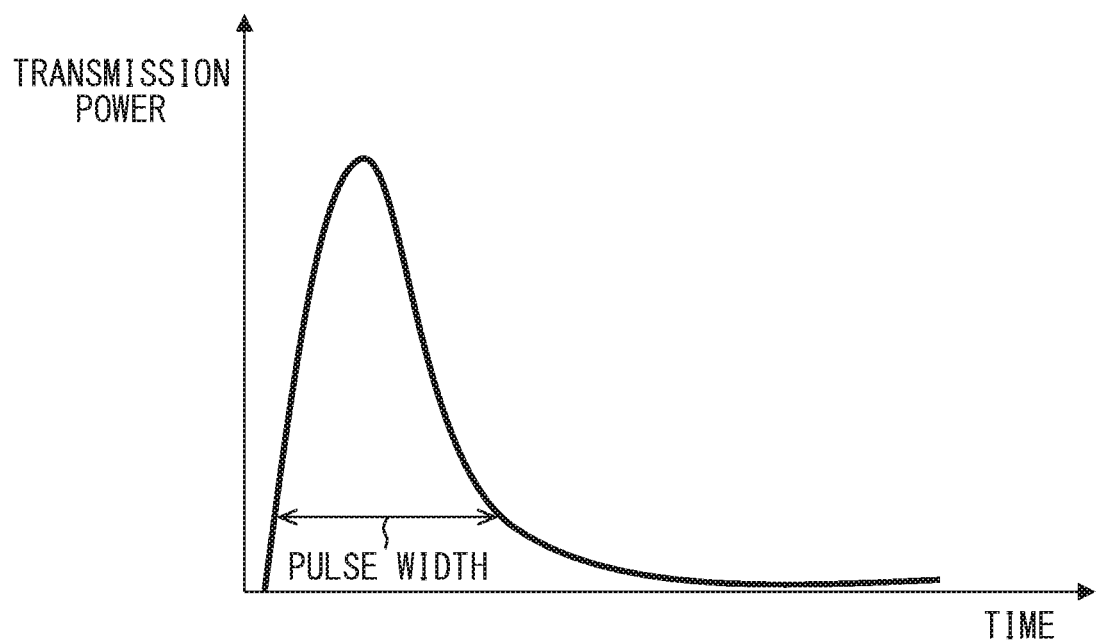
FIG. 3 is a diagram exemplarily showing a transmission waveform of a pulse for wireless communication between the mobile device and the in-vehicle device.

FIG. 3 exemplarily shows a transmission waveform of a pulse for wireless communication between the mobile device 2 and the in-vehicle device 3. The pulse may have an impulse waveform, a periodic pulse train, or an irregular pulse train.

The communication circuit 22 generates a reception signal while electrically treating a request signal received by the mobile device communication antenna 21, and outputs the generated reception signal to the control device 23. The communication circuit 22 generates a response signal while electrically treating an original signal input from the control device 23, and transmits the response signal from the mobile device communication antenna 21.

The control device 23 is configured by an IC, a microcomputer, or the like, and reads an authorization code out of a memory when the control device 23 receives a reception signal related to a request signal from the communication circuit 22. The control device 23 generates an original signal including the authorization code, and outputs the original signal to the communication circuit 22.

(Schematic Configuration of in-Vehicle Device 3)

The in-vehicle device 3 will be described next in terms of a schematic configuration thereof with reference to FIG. 2. As shown in FIG. 2, the in-vehicle device 3 includes a vehicle communication antenna 31, a communication unit 32, and a body control module (BCM) 33.

The vehicle communication antenna 31 is configured to transmit a request signal and receive a response signal transmitted from the mobile device 2 in response to the request signal, by means of radio waves. The vehicle communication antenna 31 may alternatively include a transmission antenna and a reception antenna provided independently from each other. Still alternatively, the vehicle Ve may include a plurality of transmission antennas provided at different positions. The following description assumes that the in-vehicle device 3 according to the present embodiment includes the single vehicle communication antenna 31.

The communication unit 32 generates a request signal while electrically treating an original signal input from the BCM 33, and transmits the request signal from the vehicle communication antenna 31. The communication unit 32 generates a reception signal while electrically treating a response signal received by the vehicle communication antenna 31, and outputs the generated reception signal to the BCM 33. The communication unit 32 successively specifies reception intensity of the response signal received by the vehicle communication antenna 31 by means of a well-known received signal strength indication (RSSI) circuit or the like, and outputs the specified reception intensity to the BCM 33.

The BCM 33 is mainly configured by a microcomputer including a processor, a non-transitory tangible storage medium such as a volatile memory or a nonvolatile memory, an I/O, and buses connecting these components, and has integrated vehicle control functions. The BCM 33 executes a control program stored in the nonvolatile memory for execution of various processing. The processing executed by the BCM 33 includes authorization processing of authorizing through code comparison via wireless communication with the mobile device 2, and permitting locking and unlocking doors of the vehicle Ve or permitting start of a travel driving source when authorization is established. The BCM 33 further executes inside-outside determination processing of determining whether the mobile device 2 is located inside or outside the vehicle interior of the vehicle Ve. When authorization is established in the authorization processing, the BCM 33 permits start of the travel driving source upon determination that the mobile device 2 is located inside the vehicle interior in the inside-outside determination processing, or permits locking and unlocking the doors upon determination that the mobile device 2 is located outside the vehicle interior.

(Schematic Configuration of BCM 33)

The BCM 33 will be described next in terms of an exemplary schematic configuration thereof with reference to FIG. 2. As shown in FIG. 2, the BCM 33 includes a distance measurement unit 331, a time measurement unit 332, an inside-outside determination unit 333, and a comparison unit 334, which are related to the authorization processing and the inside-outside determination processing.

The distance measurement unit 331 measures a distance between the in-vehicle device 3 and the mobile device 2 (hereinafter, called a distance between the devices) in accordance with a time for a signal traveling back and forth between the in-vehicle device 3 and the portable device 2 via wireless communication. The measurement may be exemplarily executed as follows. The distance measurement unit 331 initially measures, through counting by means of a timer circuit or the like, an elapsed time from transmission of a request signal by the communication unit 32 to reception of a response signal in response to the request signal by the communication unit 32. The distance measurement unit 331 subsequently subtracts, from the elapsed time, a processing time until transmission of a response signal in response to the request signal by the mobile device 2. The processing time may be available by being preliminarily stored as an estimated time in the nonvolatile memory of the BCM 33. The distance measurement unit 331 obtains the distance between the devices by dividing, by two, the time obtained through subtracting the processing time from the elapsed time, and multiplying the time obtained through the division by signal propagation speed. The distance measurement unit 331 may alternatively be included in the communication unit 32, in which case the communication unit 32 measures the distance between the devices to be acquired by the BCM 33.

The time measurement unit 332 measures, through counting by means of the timer circuit or the like, a time from a time point at which reception intensity, which is successively output from the communication unit 32 when the in-vehicle device 3 receives a response signal from the mobile device 2, exceeds a threshold to a time point at which the reception intensity falls below the threshold. The reception intensity can also be expressed as reception intensity of a response signal that is transmitted from the mobile device 2 via wireless communication and is received by the in-vehicle device 3. The threshold referred to in this case can be set appropriately within a range of reception intensity enabling signal reception by the in-vehicle device 3. The reception intensity enabling signal reception by the in-vehicle device 3 is exemplified by reception intensity having a SN ratio greater than a constant value.

Figure 4:
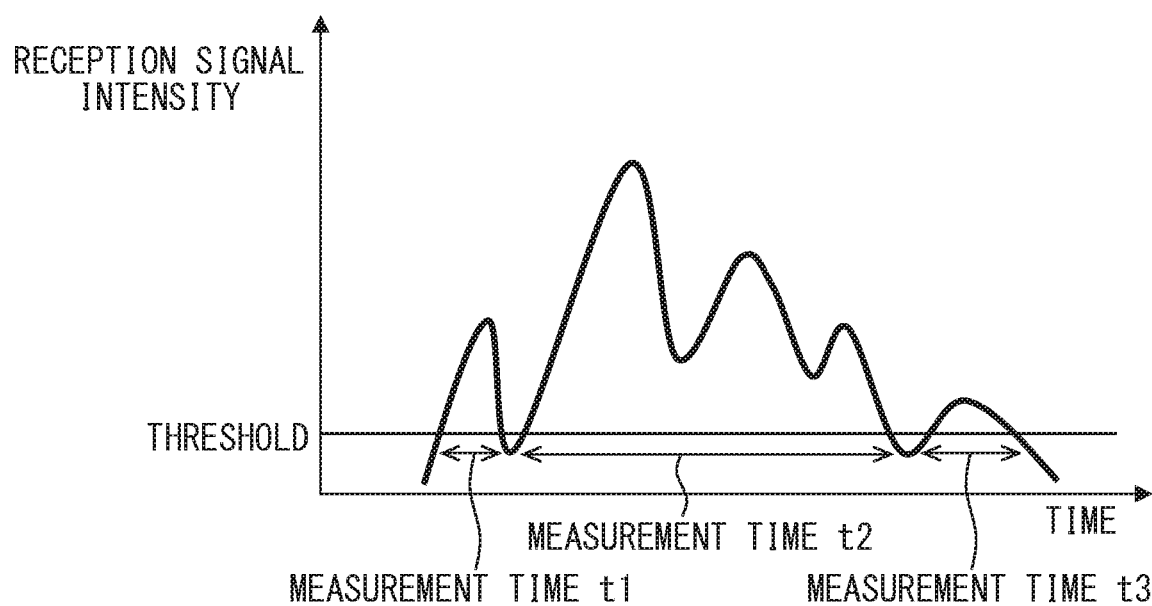
FIG. 4 is an explanatory diagram showing a case where reception intensity of a signal received in the vehicle interior exceeds and then falls below a threshold for a plurality of times.

Signals received in the vehicle interior may have an arrival time varied for reflected waves due to reflection by a reflector such as metal surrounding the vehicle interior of the vehicle Ve. The mobile device 2 may thus be positioned to initially receive signals having no interference with each other and then receive signals requiring time for convergence due to interference with each other. As shown in FIG. 4, the reception intensity may exceed the threshold and then fall below the threshold for a plurality of times. In such a case, the time measurement unit 332 measures a time from the time point at which the reception intensity exceeds the threshold to the time point at which the reception intensity falls below the threshold every time the reception intensity exceeds the threshold and then falls below the threshold, to obtain a plurality of measurement times (see t1 to t3 in FIG. 4).

The inside-outside determination unit 333 determines that the mobile device 2 is located outside the vehicle interior of the vehicle Ve in a case where the distance between the devices measured by the distance measurement unit 331 is equal to or more than a predetermined distance. The predetermined distance referred to herein may be set to make it possible to specify that the mobile device 2 is obviously located outside the vehicle interior of the vehicle Ve. In another case where the distance between the devices measured by the distance measurement unit 331 is less than the predetermined distance, the inside-outside determination unit 333 executes inside-outside determination according to the measurement time measured by the time measurement unit 332, as will be described below.

The inside-outside determination unit 333 executes inside-outside determination of determining that the mobile device 2 is located inside the vehicle interior of the vehicle Ve in a case where the measurement time measured by the time measurement unit 332 is equal to or more than a predetermined value. The inside-outside determination unit 333 executes inside-outside determination of determining that the mobile device 2 is located outside the vehicle interior of the vehicle Ve in another case where the measurement time is less than the predetermined value. The predetermined value referred to herein can be set appropriately as a value enabling determination through distinction between the case where the mobile device 2 is located inside the vehicle interior of the vehicle Ve and the case where the mobile device 2 is located outside the vehicle interior. The predetermined value may be preliminarily obtained through tests or the like, and may be exemplified by a value from about 8 nsec to 16 nsec.

Figure 5A:
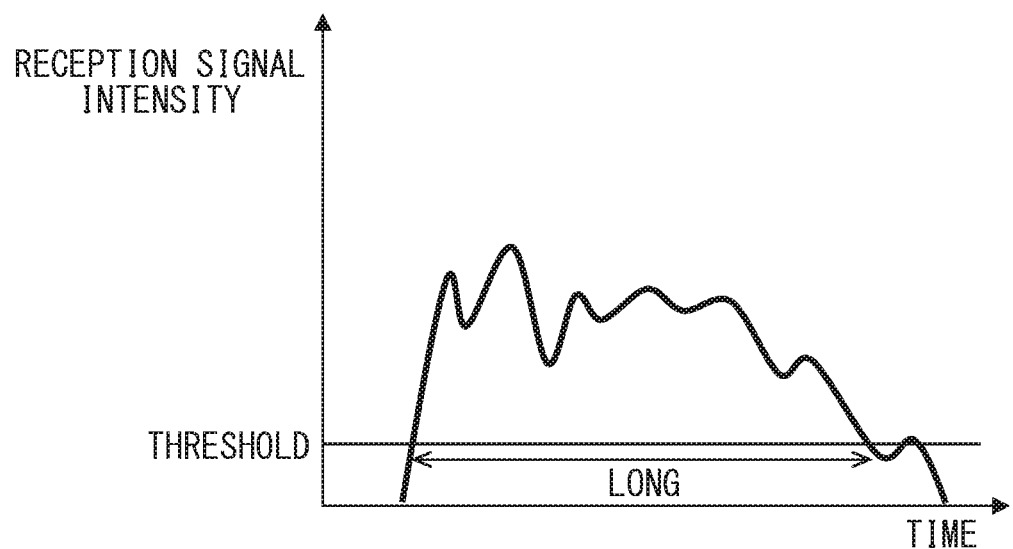
FIG. 5A is a diagram showing a measurement time measured by a time measurement unit in a case where the mobile device is located inside the vehicle interior.
Figure 5B:
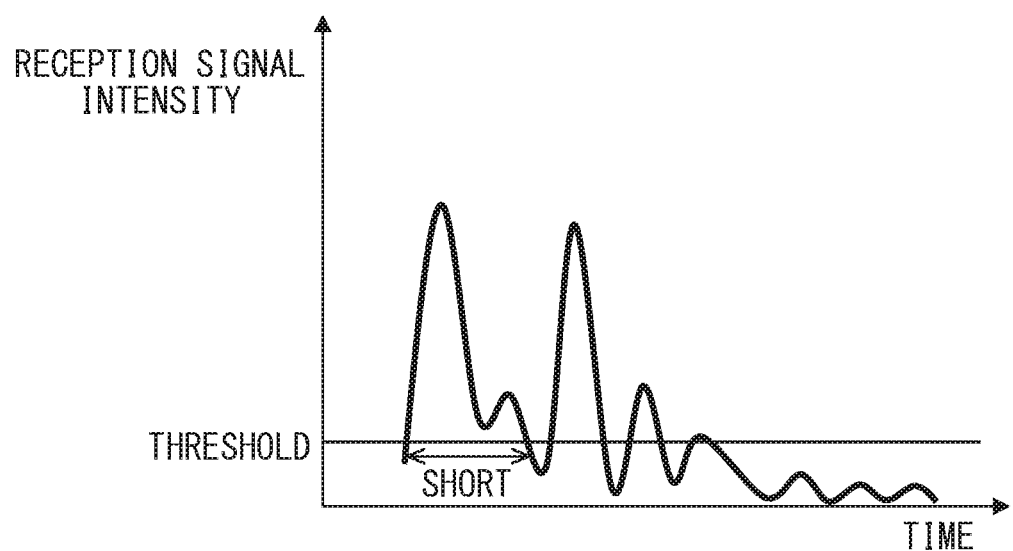
FIG. 5B is a diagram showing a measurement time measured by the time measurement unit in a case where the mobile device is located outside the vehicle interior.

Accurate inside-outside determination by the inside-outside determination unit 333 according to the measurement time measured by the time measurement unit 332 will be described below with reference to FIG. 5A and FIG. 5B. As described earlier, a radio wave carrying a response signal transmitted from the mobile device 2 may have an arrival time varied for reflected waves due to reflection by the reflector such as metal surrounding the vehicle interior of the vehicle Ve. In comparison to the case where the mobile device 2 is located outside the vehicle interior of the vehicle Ve, the number of reflected waves may be larger and the reflected waves may have a larger number of times of reflection in the case where the mobile device 2 is located inside the vehicle interior of the vehicle Ve.

This leads to increased reception of signals requiring time for convergence due to interference with each other, or signals requiring time for convergence due to a large number of times of reflection of reflected waves. As shown in FIG. 5A and FIG. 5B, in comparison to the case where the mobile device 2 is located outside the vehicle interior of the vehicle Ve, it takes longer time for reception intensity of a response signal to exceed the threshold and then fall below the threshold in the case where the mobile device 2 is located inside the vehicle interior of the vehicle Ve. The inside-outside determination unit 333, which is configured to execute inside-outside determination according to length of the time, can thus achieve accurate inside-outside determination.

In the case where the time measurement unit 332 obtains a plurality of measurement times, the inside-outside determination unit 333 may be exemplarily configured to execute inside-outside determination in accordance with the maximum measurement time out of the plurality of measurement times. In the exemplary case shown in FIG. 4, inside-outside determination is executed in accordance with the maximum measurement time t2 out of the measurement times t1 to t3. In such a case where the time measurement unit 332 obtains a plurality of measurement times, the maximum measurement time is assumed to maximally indicate influence, on measurement time, of whether the mobile device 2 is located inside or outside the vehicle interior of the vehicle Ve. Even when the time measurement unit 332 obtains a plurality of measurement times, inside-outside determination can thus be executed accurately in accordance with the maximum measurement time.

In the case where the time measurement unit 332 obtains a plurality of measurement times, the inside-outside determination unit 333 may alternatively be exemplarily configured to execute inside-outside determination in accordance with a measurement time obtained by integrating the plurality of measurement times. In the exemplary case shown in FIG. 4, inside-outside determination is executed in accordance with a measurement time obtained by integrating the measurement times t1 to t3. In such a case where the time measurement unit 332 obtains a plurality of measurement times, an integrated value of the plurality of measurement times is assumed to indicate influence, on measurement time, of whether the mobile device 2 is located inside or outside the vehicle interior of the vehicle Ve. Even when the time measurement unit 332 obtains a plurality of measurement times, inside-outside determination can thus be executed accurately in accordance with the measurement time obtained by integrating the plurality of measurement times.

A pulse as a time measurement target of the time measurement unit 332 is preferred to have smaller transmission pulse width. Such smaller pulse width leads to a clearer difference in measurement time between the case where the mobile device 2 is located inside the vehicle interior of the vehicle Ve and the case where the mobile device 2 is located outside the vehicle interior. The transmission pulse width is thus preferred to be equal to or less than a prescribed value preliminarily set in accordance with desired accuracy of inside-outside determination. For example, the transmission pulse width may be set smaller than the shortest reflected wave arrival time estimated in the case where the mobile device 2 is assumed to be located inside the vehicle interior.

The comparison unit 334 includes a nonvolatile memory, and compares an authorization code included in a reception signal and a normal authorization code stored in the nonvolatile memory of the BCM 33 when the comparison unit 334 receives the reception signal related to a response signal received by the communication unit 32. Authorization is established when the authorization codes match with each other. In a case where authorization is established and the inside-outside determination unit 333 determines that the mobile device 2 is located outside the vehicle interior of the vehicle Ve, the comparison unit 334 permits locking and unlocking the doors of the vehicle Ve. In another case where authorization is established and the inside-outside determination unit 333 determines that the mobile device 2 is located inside the vehicle interior of the vehicle Ve, the comparison unit 334 permits start of the travel driving source of the vehicle Ve.

(Inside-Outside Determination Processing at in-Vehicle Device 3)

Figure 6:
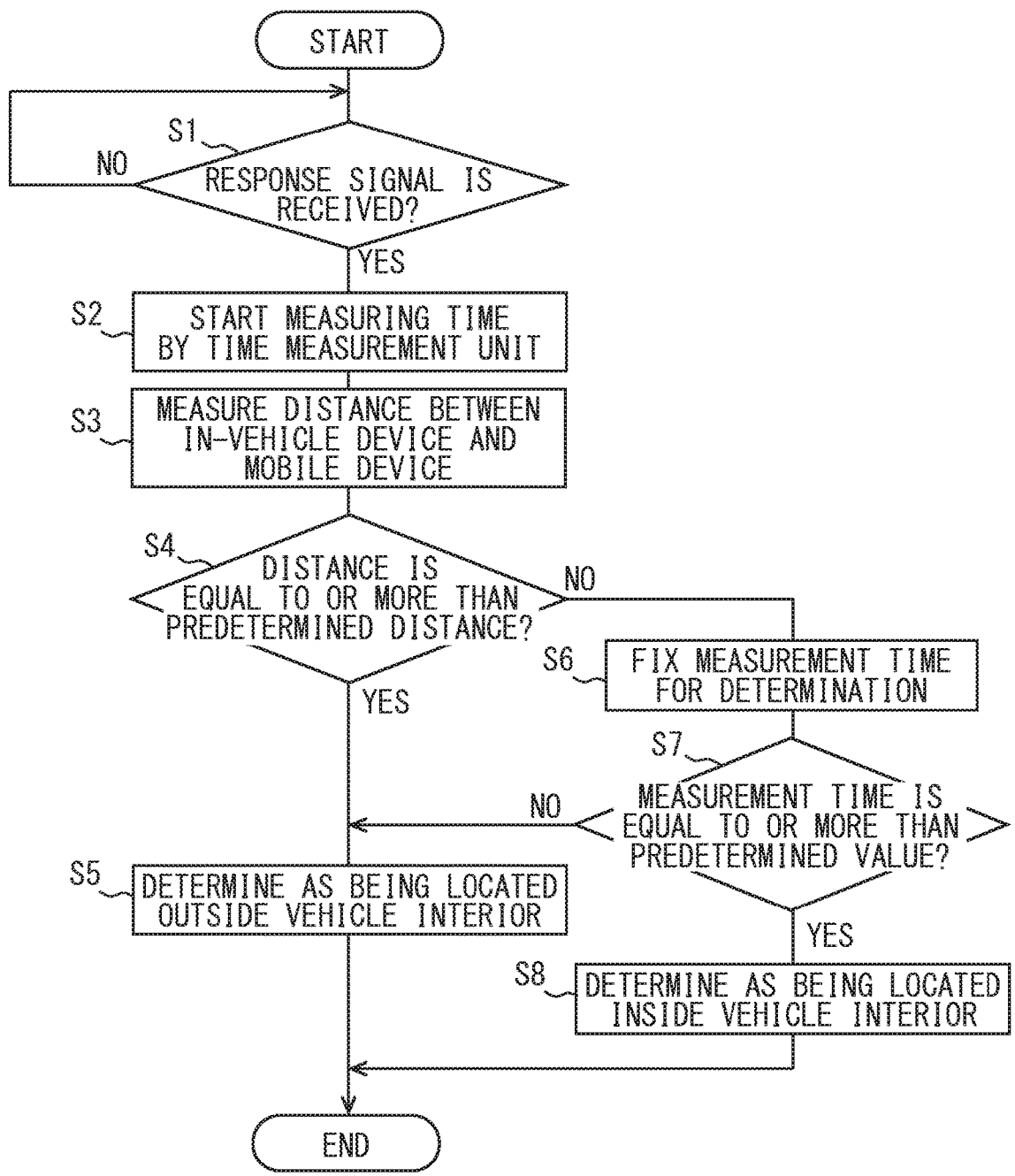
FIG. 6 is a flowchart showing an exemplary flow of inside-outside determination processing executed by the in-vehicle device.

The inside-outside determination processing at the in-vehicle device 3 will be described next with reference to the flowchart in FIG. 6. The processing shown in the flowchart in FIG. 6 may be started in a case where the in-vehicle device 3 transmits a request signal.

The process flow proceeds to S2 when the in-vehicle device 3 starts receiving, from the mobile device 2, a response signal in response to the request signal in S1. In another case where the in-vehicle device 3 does not start receiving any response signal, the processing in S1 is repeated. In S2, the time measurement unit 332 starts measuring a time from the time point at which reception intensity successively output from the communication unit 32 exceeds the threshold to the time point at which the reception intensity falls below the threshold. In S3, the distance measurement unit 331 measures the distance between the in-vehicle device 3 and the mobile device 2 (that is, the distance between the devices). The processing in S2 and the processing in S3 may be exchanged in the order of execution or may be executed in parallel with each other.

The process flow proceeds to S5 in a case where the distance measured in S3 is equal to or more than the predetermined distance in S4. The process flow proceeds to S6 in another case where the distance is less than the predetermined distance. In S5, the inside-outside determination unit 333 determines that the mobile device 2 is located outside the vehicle interior of the vehicle Ve, and ends the inside-outside determination processing. In S6, the inside-outside determination unit 333 determines the measurement time referred to for inside-outside determination. Specifically, in the case where time from the time point at which reception intensity exceeds the threshold to the time point at which the reception intensity falls below the threshold is measured for a plurality of times, the maximum measurement time may be fixed as the measurement time referred to for the inside-outside determination, or the measurement time obtained by integrating the plurality of measurement times may be fixed as the measurement time referred to for the inside-outside determination. In the other case where time from the time point at which reception intensity exceeds the threshold to the time point at which the reception intensity falls below the threshold is measured once, the measurement time is fixed as the measurement time referred to for the inside-outside determination.

The process flow proceeds to S8 in a case where the measurement time fixed in S6 is equal to or more than the above-mentioned predetermined value in S7. In another case where the measurement time is less than the predetermined value, the process flow returns to S5 and the inside-outside determination unit 333 determines that the mobile device 2 is located outside the vehicle interior of the vehicle Ve, and ends the inside-outside determination processing. In S8, the inside-outside determination unit 333 determines that the mobile device 2 is located inside the vehicle interior of the vehicle Ve, and ends the inside-outside determination processing.

Summary of First Embodiment

As described earlier, measurement time measured by the time measurement unit 332 is varied in accordance with whether the mobile device 2 is located inside or outside the vehicle interior, due to reflection at the reflector such as metal surrounding the vehicle interior of the vehicle Ve. The first embodiment provides the configuration for determination that the mobile device 2 is located inside the vehicle interior of the vehicle in the case where the measurement time measured by the time measurement unit 332 is equal to or more than the predetermined value. The first embodiment provides the configuration for determination that the mobile device 2 is located outside the vehicle interior of the vehicle in the other case where the measurement time is less than the predetermined value. The configuration according to the first embodiment thus enables accurate determination of whether the mobile device 2 is located outside or inside the vehicle interior.

Figure 7:
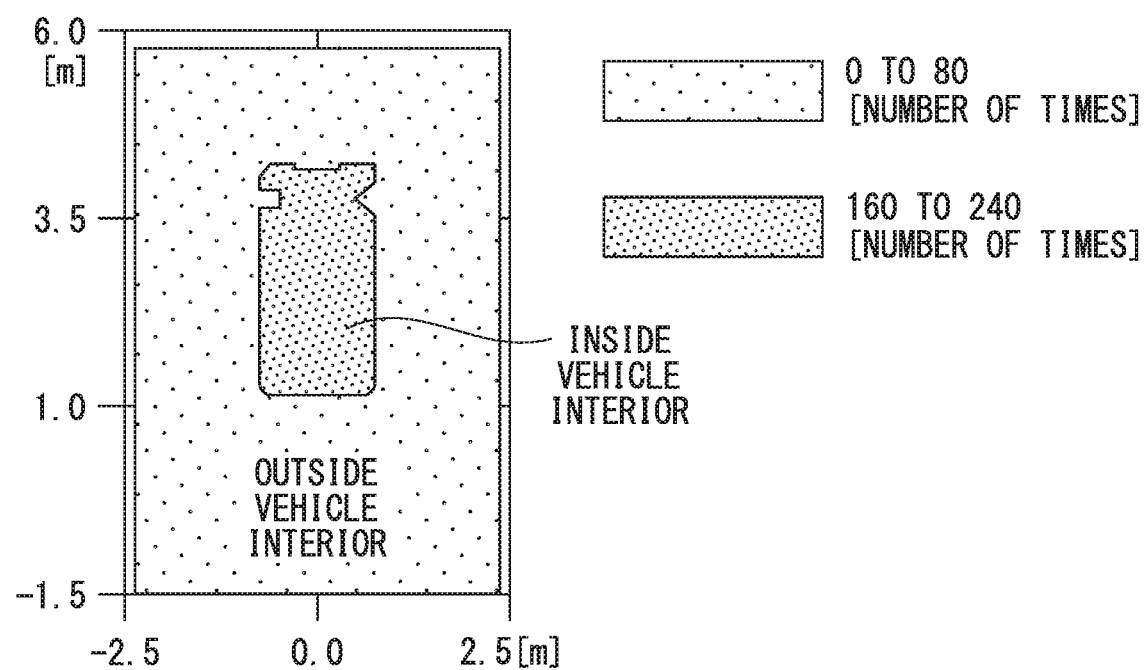
FIG. 7 is an explanatory view on effect achieved by a configuration according to an embodiment.

The configuration according to the first embodiment will be described in terms of its effect with reference to FIG. 7. FIG. 7 is a view indicating relation between measurement time actually measured by the time measurement unit 332 and the position of the mobile device 2 with the position of the mobile device 2 relative to the vehicle Ve being changed. FIG. 7 indicates the measurement time measured by the time measurement unit 332 by means of the number of counts while reception intensity having exceeded the threshold is kept more than the threshold. FIG. 7 exemplifies a case where counts are executed at the interval of 0.1 nsec. Accordingly, 0 to 240 times in FIG. 7 correspond to 0 to 24 nsec.

As indicated in FIG. 7, in the case where the mobile device 2 is located inside the vehicle interior, the actual number of counts falls within a range from 160 to 240 times without including any number equal to or less than 160 times. In other words, there is no measurement time equal to or less than 16 nsec. In the other case where the mobile device 2 is located outside the vehicle interior, the actual number of counts falls within a range from 0 to 80 times without including any number equal to or more than 80 times. In other words, there is no measurement time equal to or more than 8 nsec. The configuration according to the first embodiment thus achieves accurate determination of whether the mobile device 2 is located inside or outside the vehicle interior of the vehicle in accordance with the measurement time.

When the configuration is not applied, it is difficult to correctly count the number of reflected waves interfering with each other in a case where a transmitted pulse has too large a pulse width to be ignored relative to an arrival time of the reflected waves at the reflector. This may lead to failure in accurate determination of whether the mobile device 2 is located outside or inside the vehicle interior. In contrast, the first embodiment provides the configuration for measurement of measurement time exceeding the threshold even in such a case where reflected waves interfere with each other. With the configuration according to the first embodiment, a result of measurement time is thus less likely to be influenced. This leads to accurate determination of whether the mobile device 2 is located inside or outside the vehicle interior. Even in the case where a pulse is adopted for wireless communication, the configuration according to the first embodiment thus achieves accurate determination of whether the mobile device 2 is located inside or outside the vehicle interior regardless of pulse width of the pulse transmitted via wireless communication.

When the configuration is not applied, it may achieve improvement in accuracy of determination by setting the threshold for counting of the number of waves slightly smaller than the maximum value of received power in the case where reflected waves interfere with each other. However, the received power is largely varied by a position of reception and existence of any obstacle, so that it is difficult to improve accuracy of the determination. In contrast, the configuration according to the first embodiment achieves stably accurate determination of whether the mobile device 2 is located inside or outside the vehicle interior regardless of received power.

There may also be a method of accurately determining whether the mobile device 2 is located inside or outside the vehicle interior by specifying the position of the mobile device 2 through trilateration by means of a plurality of in-vehicle devices disposed at the vehicle Ve and configured to receive radio waves from the mobile device 2. However, this configuration leads to increase in the number of the in-vehicle devices. In contrast, the configuration according to the first embodiment advantageously achieves accurate determination of whether the mobile device 2 is located inside or outside the vehicle interior, with the single in-vehicle device 3.

Second Embodiment

The first embodiment provides the inside-outside determination unit 333 configured to determine that the mobile device 2 is located outside the vehicle interior of the vehicle Ve without executing inside-outside determination according to measurement time measured by the time measurement unit 332 when the distance between the devices measured by the distance measurement unit 331 is equal to or more than the predetermined distance. However, the present disclosure is not necessarily limited to this configuration. For example, the in-vehicle device 3 may not include the distance measurement unit 331 and the inside-outside determination unit 333 may not be configured to determine that the mobile device 2 is located outside the vehicle interior of the vehicle Ve in accordance with the distance between the devices measured by the distance measurement unit 331.

Third Embodiment

The present disclosure is not limited to the configuration according to the first embodiment, but can also adopt the following configuration according to a third embodiment. The configuration according to the third embodiment will be described below. The third embodiment relates to a vehicle authorization system 1a including a mobile device 2a carried by a user and an in-vehicle device 3a used at the vehicle Ve. The mobile device 2a and the in-vehicle device 3a are configured similarly to the mobile device 2 and the in-vehicle device 3 according to the first embodiment, except for differences in part of the processing. The mobile device 2a according to the third embodiment corresponds to the subject device and the vehicle system device.

Figure 8:
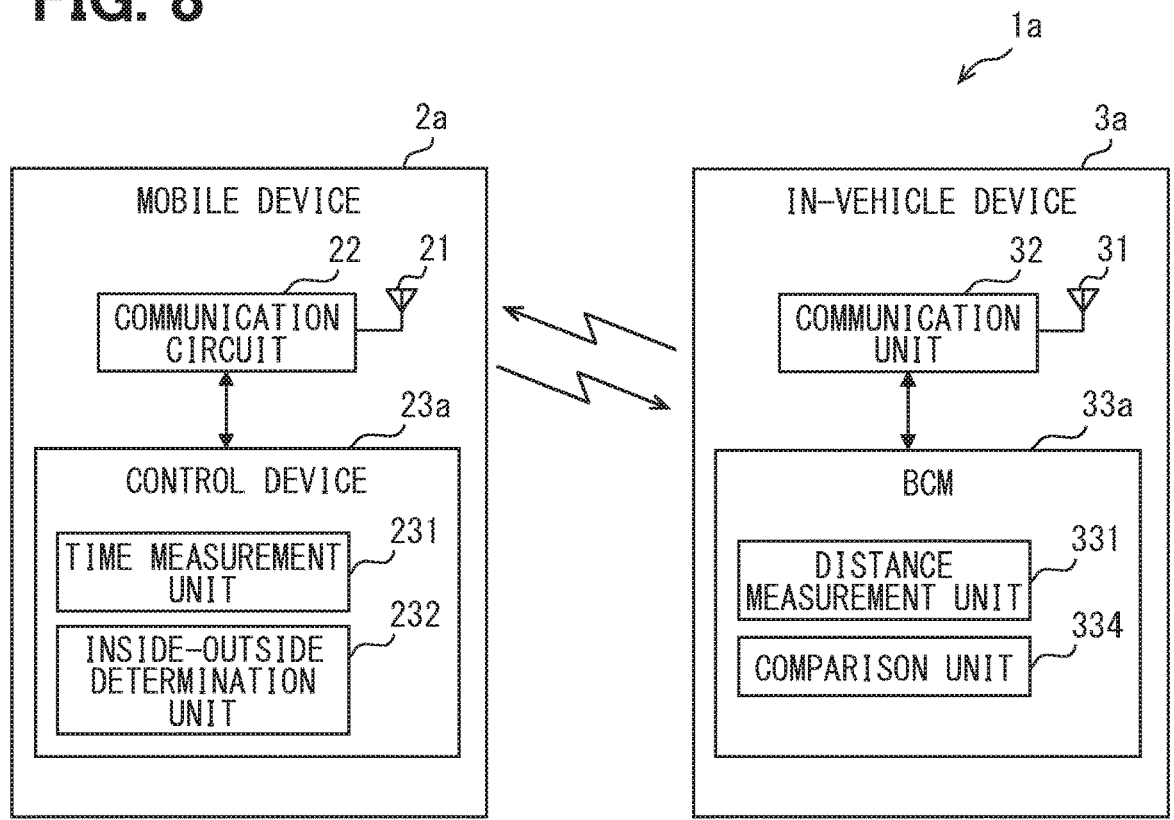
FIG. 8 is a diagram exemplarily showing schematic configurations of the mobile device and the in-vehicle device.

The mobile device 2a will be described with reference to FIG. 8. As shown in FIG. 8, the mobile device 2a includes a mobile device communication antenna 21, a communication circuit 22, and a control device 23a. The mobile device 2a is configured similarly to the mobile device 2 according to the first embodiment, except that the control device 23a replaces the control device 23. The communication circuit 22 according to the third embodiment successively specifies reception intensity of a request signal received by the mobile device communication antenna 21 by means of a well-known RSSI circuit or the like, and outputs the reception intensity thus specified to the control device 23a.

As shown in FIG. 8, the control device 23a includes a time measurement unit 231 and an inside-outside determination unit 232. The control device 23a is configured similarly to the control device 23 according to the first embodiment except that the control device 23a includes the time measurement unit 231 and the inside-outside determination unit 232, that the control device 23a acquires a distance between the in-vehicle device 3a and the mobile device 2a (that is, the distance between the devices) measured by the in-vehicle device 3a, and that the control device 23a transmits, to the in-vehicle device 3a, a result of inside-outside determination by the inside-outside determination unit 232. The control device 23a may be configured to acquire the distance between the devices transmitted from the in-vehicle device 3a via the mobile device communication antenna 21 and the communication circuit 22 after the mobile device 2a transmits a response signal in response to a request signal.

Similarly to the time measurement unit 332 according to the first embodiment, the time measurement unit 231 measures, through counting by means of the timer circuit or the like, a time from a time point at which reception intensity, which is successively output from the communication circuit 22 when the mobile device 2a receives a request signal from the in-vehicle device 3a, exceeds a threshold to a time point at which the reception intensity falls below the threshold. The reception intensity can also be expressed as reception intensity of a request signal that is transmitted from the in-vehicle device 3a via wireless communication and is received by the mobile device 2a. The threshold referred to in this case can be set appropriately within a range of reception intensity enabling signal reception by the mobile device 2a. The reception intensity enabling signal reception by the mobile device 2a is exemplified by reception intensity having at least a constant SN ratio. The time measurement unit 231 may obtain a plurality of measurement times similarly to the time measurement unit 332.

The inside-outside determination unit 232 determines that the mobile device 2a is located outside the vehicle interior of the vehicle Ve without executing inside-outside determination according to the measurement time, in a case where the distance between the devices acquired from the in-vehicle device 3a is equal to or more than the predetermined distance. In another case where the distance between the devices acquired from the in-vehicle device 3a is less than the predetermined distance, the inside-outside determination unit 232 executes inside-outside determination according to the measurement time as follows.

Similarly to the inside-outside determination unit 333, the inside-outside determination unit 232 executes inside-outside determination of determining that the mobile device 2a is located inside the vehicle interior of the vehicle Ve in a case where a measurement time measured by the time measurement unit 231 is equal to or more than a predetermined value, and determining that the mobile device 2a is located outside the vehicle interior of the vehicle Ve in another case where the measurement time is less than the predetermined value. In the case where the time measurement unit 231 obtains a plurality of measurement times, the inside-outside determination unit 232 may be configured, similarly to the inside-outside determination unit 333, to execute inside-outside determination in accordance with the maximum measurement time out of the plurality of measurement times or a measurement time obtained by integrating the plurality of measurement times.

The control device 23a transmits the result of inside-outside determination by the inside-outside determination unit 232, to the in-vehicle device 3a via the mobile device communication antenna 21 and the communication circuit 22. The result of inside-outside determination may be transmitted in a different frequency band by means of an antenna different from the mobile device communication antenna 21 configured to transmit a response signal.

The in-vehicle device 3a will be described next in terms of a schematic configuration thereof with reference to FIG. 8. As shown in FIG. 8, the in-vehicle device 3a includes a vehicle communication antenna 31, a communication unit 32, and a BCM 33a. The in-vehicle device 3a is configured similarly to the in-vehicle device 3 according to the first embodiment, except that the BCM 33a replaces the BCM 33.

As shown in FIG. 8, the BCM 33a includes a distance measurement unit 331 and a comparison unit 334. The BCM 33a is configured similarly to the BCM 33 according to the first embodiment except that the BCM 33a includes neither the time measurement unit 332 nor the inside-outside determination unit 333, that the BCM 33a transmits, to the mobile device 2a, the distance between the devices measured by the distance measurement unit 331, and that the BCM 33a acquires a result of inside-outside determination executed by the mobile device 2a. The BCM 33a may be configured to acquire the result of inside-outside determination by the mobile device 2a via the vehicle communication antenna 31 and the communication unit 32. Similarly to the comparison unit 334 according to the first embodiment, the comparison unit 334 according to the third embodiment may be configured to permit locking and unlocking the doors of the vehicle Ve or permit start of the travel driving source of the vehicle Ve in accordance with the result of inside-outside determination by the mobile device 2a.

The third embodiment adopts a configuration for execution of inside-outside determination by the mobile device 2a according to a time from a time point at which reception intensity of a request signal received from the in-vehicle device 3a exceeds a threshold to a time point at which the reception intensity falls below the threshold, instead of inside-outside determination by the in-vehicle device 3 according to the time from the time point at which reception intensity of a response signal received from the mobile device 2 exceeds a threshold to the time point at which the reception intensity falls below the threshold. Also in such a configuration, the time from the time point at which the reception intensity exceeds the threshold to the time point at which the reception intensity falls below the threshold is similarly influenced by whether the mobile device 2a is located inside or outside the vehicle interior. Similarly to the configuration according to the first embodiment, the configuration according the third embodiment effectively achieves highly accurate determination of whether the mobile device 2a is located outside or inside the vehicle interior.

Fourth Embodiment

The third embodiment provides the configuration for execution of inside-outside determination by the mobile device 2a according to time from the time point at which reception intensity of a request signal received from the in-vehicle device 3a exceeds a threshold to the time point at which the reception intensity falls below the threshold. However, the present disclosure is not necessarily limited to this configuration, but may adopt the following configuration according to a fourth embodiment. The configuration according to the fourth embodiment will be described below. The fourth embodiment provides a vehicle authorization system 1b configured similarly to the vehicle authorization system 1a according to the third embodiment except that the vehicle authorization system 1b includes a mobile device 2b in place of the mobile device 2a. The mobile device 2b according to the fourth embodiment corresponds to the subject device and the vehicle system device.

Figure 9:
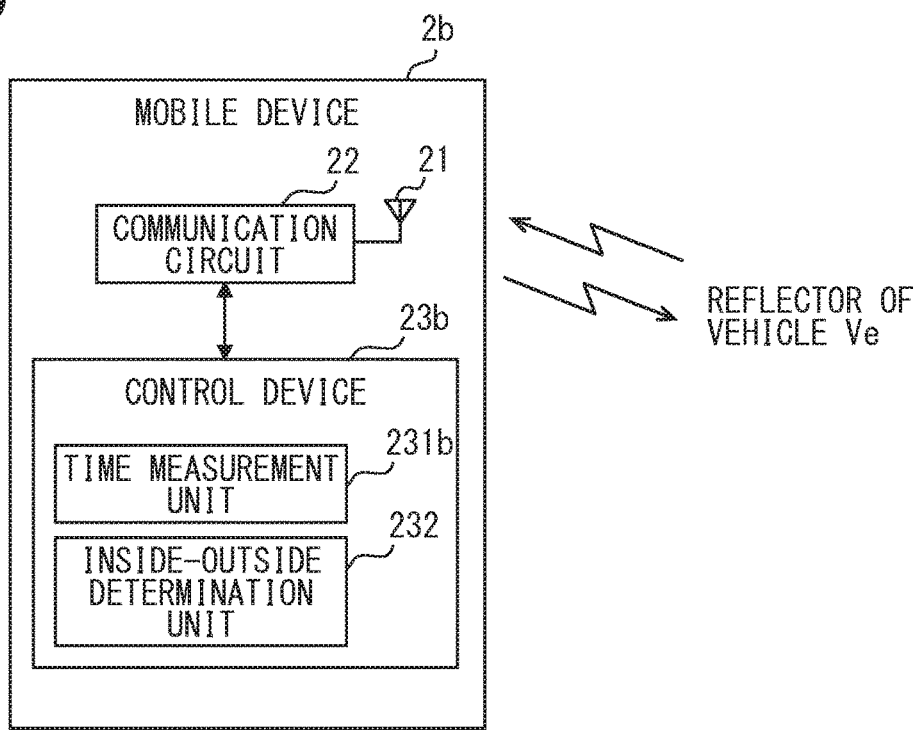
FIG. 9 is a diagram exemplarily showing a schematic configuration of the mobile device.

The mobile device 2b will be described below with reference to FIG. 9. As shown in FIG. 9, the mobile device 2b includes a mobile device communication antenna 21, a communication circuit 22, and a control device 23b. The mobile device 2b is configured similarly to the mobile device 2a according to the third embodiment, except that the control device 23b replaces the control device 23a.

As shown in FIG. 9, the control device 23b includes a time measurement unit 231b and an inside-outside determination unit 232. The control device 23b is configured similarly to the control device 23a according to the third embodiment, except that the time measurement unit 231b replaces the time measurement unit 231.

The time measurement unit 231b is configured similarly to the time measurement unit 231 according to the third embodiment except that, as a signal of a measurement target of time from the time point at which reception intensity exceeds a threshold to the time point at which the reception intensity falls below the threshold, instead of a request signal transmitted from the in-vehicle device 3a, a signal transmitted from the mobile device 2b functioning as the subject device is reflected by the reflector such as metal surrounding the vehicle interior of the vehicle Ve. The target signal of the time measurement unit 231b may be a signal other than a response signal, although the following description exemplarily assumes a response signal.

The time measurement unit 231b measures a time from the time point at which reception intensity, which is successively output from the communication circuit 22 when a response signal transmitted from the mobile device 2b is reflected by the reflector of the vehicle Ve and is received by the mobile device 2b functioning as the subject device, exceeds a threshold to the time point at which the reception intensity falls below the threshold. The reception intensity can also be expressed as reception intensity of a response signal that is transmitted from the mobile device 2b as the subject device via wireless communication and is received by the mobile device 2b. The threshold referred to in this case can be set appropriately within a range of reception intensity enabling signal reception by the mobile device 2b. The reception intensity enabling signal reception by the mobile device 2b is exemplified by reception intensity having at least a constant SN ratio. The time measurement unit 231b may obtain a plurality of measurement times similarly to the time measurement unit 231.

Similarly to the inside-outside determination unit 232 according to the first embodiment, the inside-outside determination unit 232 according to the fourth embodiment executes inside-outside determination of determining that the mobile device 2b is located inside the vehicle interior of the vehicle Ve in a case where the measurement time measured by the time measurement unit 231b is equal to or more than a predetermined value, and determining that the mobile device 2b is located outside the vehicle interior of the vehicle Ve in another case where the measurement time is less than the predetermined value. In the case where the time measurement unit 231b obtains a plurality of measurement times, the inside-outside determination unit 232 according to the fourth embodiment may be configured, similarly to the inside-outside determination unit 232 according to the first embodiment, to execute inside-outside determination in accordance with the maximum measurement time out of the plurality of measurement times or a measurement time obtained by integrating the plurality of measurement times.

The control device 23b transmits a result of inside-outside determination by the inside-outside determination unit 232, to the in-vehicle device 3a via the mobile device communication antenna 21 and the communication circuit 22. As in the third embodiment, the comparison unit 334 of the in-vehicle device 3a may be configured to permit locking and unlocking the doors of the vehicle Ve or permit start of the travel driving source of the vehicle Ve in accordance with the result of inside-outside determination by the mobile device 2b.

The fourth embodiment adopts a configuration for inside-outside determination according to reception intensity of a signal reflected by the reflector of the vehicle Ve and received by the mobile device 2b as the subject device out of signals transmitted from the mobile device 2b, instead of inside-outside determination according to reception intensity of a request signal received from the in-vehicle device 3a. Also in such a configuration, the time from the time point at which reception intensity exceeds a threshold to the time point at which the reception intensity falls below the threshold is similarly influenced by whether the mobile device 2b is located inside or outside the vehicle interior. Similarly to the configuration according to the first embodiment, the configuration according the present embodiment effectively achieves highly accurate determination of whether the mobile device 2b is located outside or inside the vehicle interior.

Fifth Embodiment

The third and fourth embodiments each provide the inside-outside determination unit 232 configured to determine that the mobile device 2a or 2b is located outside the vehicle interior of the vehicle Ve without executing inside-outside determination according to measurement time measured by the time measurement unit 231 or 231b when the distance between the devices acquired from the in-vehicle device 3a is equal to or more than the predetermined distance. The present disclosure is not necessarily limited to this configuration. For example, the in-vehicle device 3a may not include the distance measurement unit 331 and the inside-outside determination unit 232 need not be configured to determine that the mobile device 2a or 2b is located outside the vehicle interior of the vehicle Ve in accordance with the distance between the devices acquired from in-vehicle device 3a.

Sixth Embodiment

The embodiments described above each provide the configuration in which a result of inside-outside determination by the inside-outside determination unit 232 or 333 is referred to for permission of locking and unlocking the doors of the vehicle Ve and permission of start of the travel driving source of the vehicle Ve by the comparison unit 334 of the in-vehicle device 3 or 3a. The present disclosure is not necessarily limited to this configuration. The result of inside-outside determination may also be referred to for different processing such as determination of whether or not the mobile device 2, 2a, or 2b is confined in the vehicle interior of the vehicle Ve.

Seventh Embodiment

The above embodiments each provide the configuration for inside-outside determination executed by one of the mobile device 2a or 2b and the in-vehicle device 3. The present disclosure is not necessarily limited to this configuration. For example, the first embodiment may be combined with the second or third embodiment to achieve a configuration for inside-outside determination executed by both the mobile device 2a or 2b and the in-vehicle device 3. Results of inside-outside determination by the mobile device 2a or 2b and the in-vehicle device 3 may be supplemented with each other such that determination results are confirmed if the both results match with each other.

Eighth Embodiment

The above embodiments each provide the configuration in which pulses are used for wireless communication between the mobile device 2, 2a, or 2b and the in-vehicle device 3 or 3a. The present disclosure is not necessarily limited to this configuration. These embodiments may alternatively adopt sinusoidal waves or the like.

The flowcharts or the processing depicted in the flowcharts described in the present disclosure include a plurality of sections (also referred to as steps) each of which is expressed as S1 or the like. Each of the sections can further be divided into a plurality of subsections, or a plurality of sections can be combined together to configure a single section. These sections can alternatively be referred to as circuits, devices, modules, or means.

Each of the plurality of sections or some of the sections combined to each other can be embodied as (i) a software section combined with a hardware unit (e.g., a computer) or (ii) a hardware section (e.g., an integrated circuit or a wiring logic circuit) including or excluding a function of a relevant device.

Note that the present disclosure is not limited to the embodiments described above and can variously be modified within the scope of claims. An embodiment obtained by appropriately combining the technical means disclosed in the different embodiments is also included in the technical scope of the present disclosure.

What is claimed is:

1. A vehicle system device used in a vehicle system that enables an in-vehicle device used in a vehicle and a mobile device carried by a user to transmit and receive a signal via a wireless communication, the vehicle system device provided as the in-vehicle device or the mobile device, the vehicle system device comprising:
    a time measurement unit configured to measure a time from a time point at which a reception intensity of the signal, which is transmitted via the wireless communication and received by the vehicle system device, exceeds a threshold to a time point at which the reception intensity falls below the threshold, and the threshold being within a receivable range of the reception intensity of the signal for the vehicle system device; and
    an inside-outside determination unit configured to execute an inside-outside determination of determining that the mobile device is located inside a vehicle interior of the vehicle when a measurement time, which is provided as the time measured by the time measurement unit, is equal to or more than a predetermined value, and determining that the mobile device is located outside the vehicle interior of the vehicle when the measurement time is less than the predetermined value.

2. The vehicle system device according to claim 1, wherein
    when the time measurement unit measures a plurality of the measurement times from a time point at which the vehicle system device receives the signal transmitted via the wireless communication to a time point at which the signal has an unreceivable reception intensity, the inside-outside determination unit executes the inside-outside determination in accordance with a maximum measurement time out of the plurality of the measurement times.

3. The vehicle system device according to claim 1, wherein
    when the time measurement unit measures a plurality of the measurement times from a time point at which the vehicle system device receives the signal transmitted via wireless communication to a time point at which the signal has an unreceivable reception intensity, the inside-outside determination unit executes the inside-outside determination in accordance with a measurement time obtained by integrating the plurality of the measurement times.

4. The vehicle system device according to claim 1, further comprising
    a distance measurement unit configured to measure a distance between the in-vehicle device and the mobile device in accordance with a time for signal reciprocation via the wireless communication between the in-vehicle device and the mobile device, wherein
    the inside-outside determination unit determines that the mobile device is located outside the vehicle interior of the vehicle without using the measurement time when the mobile device is estimated to be obviously located outside the vehicle interior in accordance with the distance measured by the distance measurement unit, and executes the inside-outside determination using the measurement time when the mobile device is not estimated to be located outside the vehicle interior in accordance with the distance.

5. The vehicle system device according to claim 1, wherein
    the vehicle system device is provided as the in-vehicle device.

6. The vehicle system device according to claim 1, wherein
    the vehicle system device is provided as the mobile device.

7. The vehicle system device according to claim 6, wherein
    the time measurement unit measures the time from a time point at which the reception intensity of the signal, which is transmitted from the mobile device via the wireless communication, reflected by a reflector of the vehicle, and received by the mobile device, exceeds the threshold to the time point at which the reception intensity falls below the threshold, and the threshold being within the range of the reception intensity of a receivable signal for the vehicle system device.

8. A vehicle system comprising:
an in-vehicle device used in a vehicle; and
a mobile device carried by a user;
wherein:
the in-vehicle device and the mobile device transmit and receive a signal via a wireless communication; and
at least one of the in-vehicle device and the mobile device is provided as a subject vehicle, and the subject vehicle includes:
a time measurement unit configured to measure a time from a time point at which reception intensity of the signal, which is transmitted via the wireless communication and received by the subject device, exceeds a threshold to a time point at which the reception intensity falls below the threshold, and the threshold being within a receivable range of the reception intensity of the signal for the vehicle system device; and
an inside-outside determination unit configured to execute an inside-outside determination of determining that the mobile device is located inside a vehicle interior of the vehicle when a measurement time, which is provided as the time measured by the time measurement unit, is equal to or more than a predetermined value, and determining that the mobile device is located outside the vehicle interior of the vehicle when the measurement time is less than the predetermined value.

9. A vehicle system device used in a vehicle system that enables an in-vehicle device used in a vehicle and a mobile device carried by a user to transmit and receive a signal via a wireless communication, the vehicle system device provided as the in-vehicle device or the mobile device,
the vehicle system device comprising a processor configured to:
measure a time from a time point at which a reception intensity of the signal, which is transmitted via the wireless communication and received by the vehicle system device, exceeds a threshold to a time point at which the reception intensity falls below the threshold, and the threshold being within a receivable range of the reception intensity of the signal for the vehicle system device; and
execute an inside-outside determination of determining that the mobile device is located inside a vehicle interior of the vehicle when a measurement time, which is provided as the time measured by the processor, is equal to or more than a predetermined value, and determining that the mobile device is located outside the vehicle interior of the vehicle when the measurement time is less than the predetermined value.

* * * * *